(12) United States Patent
Rackley et al.

(10) Patent No.: US 11,623,467 B2
(45) Date of Patent: Apr. 11, 2023

(54) GRIPPING DEVICE SYSTEM AND METHODS OF MAKING AND USING THE SAME

(71) Applicants: Mollie Rackley, Wilmington, NC (US); Andrea Busch, Wilmington, NC (US)

(72) Inventors: Mollie Rackley, Wilmington, NC (US); Andrea Busch, Wilmington, NC (US)

(*) Notice: Subject to any disclaimer, the term of this patent is extended or adjusted under 35 U.S.C. 154(b) by 0 days.

(21) Appl. No.: 17/684,503

(22) Filed: Mar. 2, 2022

(65) Prior Publication Data
US 2022/0281261 A1 Sep. 8, 2022

Related U.S. Application Data

(60) Provisional application No. 63/155,484, filed on Mar. 2, 2021.

(51) Int. Cl.
*B43K 23/008* (2006.01)
*B43K 23/00* (2006.01)
*G09B 11/02* (2006.01)

(52) U.S. Cl.
CPC .......... *B43K 23/008* (2013.01); *B43K 23/001* (2013.01); *G09B 11/02* (2013.01)

(58) Field of Classification Search
CPC .. B43K 23/008; B43K 23/001; B43K 23/004; B43K 23/012; B43K 23/00; B43K 23/002; B43K 23/016; G09B 11/02; G09B 11/00

USPC .......................................................... 401/6–8
See application file for complete search history.

(56) References Cited

U.S. PATENT DOCUMENTS

| | | | | |
|---|---|---|---|---|
| 141,287 | A * | 7/1873 | Orndorff | 401/6 |
| 6,149,330 | A * | 11/2000 | Chuang | B43K 21/003 401/35 |
| 6,612,766 | B2 * | 9/2003 | Collins | B43K 29/00 401/52 |
| 9,789,727 | B1 * | 10/2017 | Phillips | B43K 19/02 |

\* cited by examiner

*Primary Examiner* — David J Walczak
(74) *Attorney, Agent, or Firm* — Dogwood Patent and Trademark Law; Ashley D. Johnson

(57) ABSTRACT

A device at properly aligns a user's hand when gripping a writing implement, such as pencil. The device includes four separate elements that combine in specific ways to grow and/or build a mature grasp. The device includes a base that is configure round the pencil and provides support for the user's fingers. A handle can releasably attach to the writing implement, providing support for the user's palm. A web support can be releasably attached to the handle, thereby stabilizing the user's thumb while gripping the writing implement. The device can also include an independent web positioner support that can be moved closer or towards the base depending on the separation needed. Advantageously, the grip device provides several stages to develop and build a mature grip pattern.

20 Claims, 13 Drawing Sheets

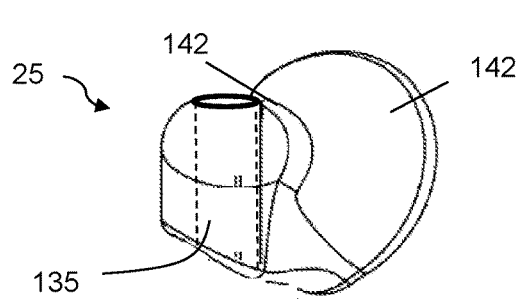
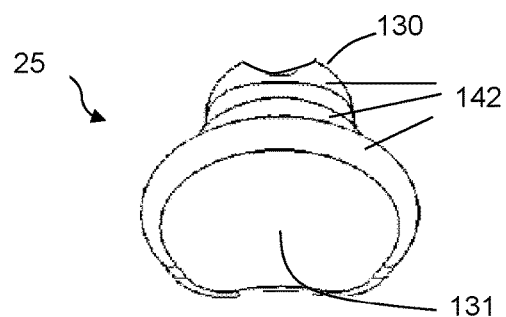
Fig. 7a　　　　　　　　　　Fig. 7b
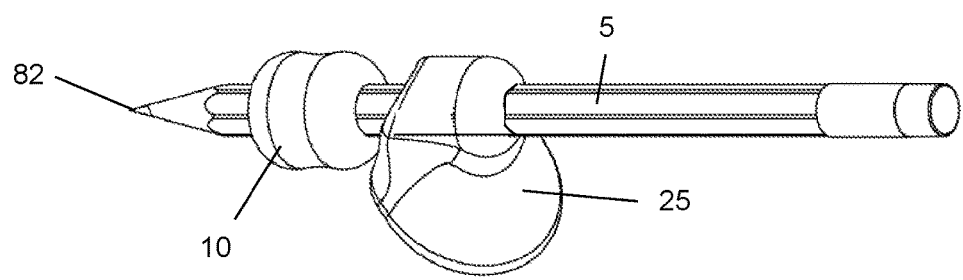
Fig. 7c
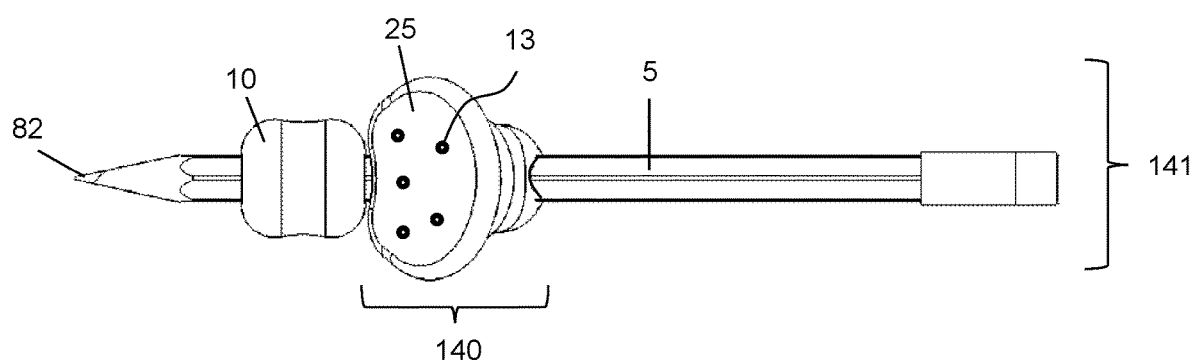
Fig. 7d

GRIPPING DEVICE SYSTEM AND METHODS OF MAKING AND USING THE SAME

CROSS-REFERENCE TO RELATED APPLICATIONS

This application claims priority to U.S. Provisional Patent Application No. 63/155,484, filed Mar. 2, 2021, the entire content of which is incorporated by reference herein.

TECHNICAL FIELD

The presently disclosed subject matter is directed to a system that includes elements used as an aid for the proper gripping of a handheld instrument (e.g., pencil) used for writing, drawing, and the like. The disclosed system inhibits writing fatigue and helps users to hold a pen or pencil correctly.

BACKGROUND

When first learning how to write and draw, many children struggle with holding the writing implement (e.g., a pencil) in an appropriate manner. Specifically, the fine motor skills of children develop from large muscle (gross motor) to small muscles (fine motor). In addition, young children have not developed the bone structure that allows for completed joints. Particularly, because their bones have not completely developed, the joints of children include gaps. As a result, a child may be unable to grip a pencil, may improperly hold the pencil using their fist, or may use a variation of another immature and inefficient grasp to hold and manipulate the pencil. Thus, inefficient patterns can develop, such as a thumb wrap, index hook, thumb hyperextension, finger hyper flexion and/or a fisted grasp pattern. Such undesirable patterns negatively affect grasp and handwriting even after muscles have matured and bones have closed the gap at the joints.

A variety of devices have been developed to help a child improve his or her grip. However, prior art gripping devices have various shortcomings and generally fail to promote proper grip positioning techniques. For example, prior art grips commonly require the children to grasp large portions of the grip to increase the surface area, facilitating inefficient habits. Other prior art grips include a divider between fingers to trap fingers in place. However, the dividers do not address the problem of proximal control. Further, users can still grasp inefficiently and wrap the fingers over the barrier. Still other prior art grips merely position the thumb, index, and middle fingers, leaving the other fingers improperly positioned to maintain the correct pencil-holding posture. It would therefore be beneficial to provide a grip that overcomes the shortcomings of the prior art.

SUMMARY

In some embodiments, the presently disclosed subject matter is directed to a corrective gripping system. The system comprises a base defined by a first end and a second end. The base further includes a central indentation position about a width of the base, sized and shaped to accommodate a middle finger, index finger, and thumb of a user. The base includes an internal bore that spans an interior of the base from the first end to the second end. The system comprises a handle defined by a first end and a second end, and first and second bores that extend through an interior of the handle from the first end to the second end. The handle also includes a handle attachment. The system includes a web support configured to releasably extend about an exterior surface of the handle, the web support defined by a first end and a second end, and an attachment that cooperates with the handle to attach the web support to the handle. The system includes an independent web positioner defined by a first end and a second end, and an internal bore that spans the first end of the independent web positioner to the second end of the independent web positioner. The independent web positioner includes an arched support system to accommodate the metacarpophalangeal joint of the thumb and index finger to fit in the web space. It further includes a thumb ridge sized and shaped to accommodate the thumb of a user and a finger ridge sized and shaped to accommodate the ring finger of a user. The independent web positioner is used alone or with the base only. The device independent web positioner, handle, web support, and base are configured to be added or removed as needed to customize the system.

In some embodiments, the system further includes a writing implement selected from a pencil, a pen, a marker, or combinations thereof.

In some embodiments, the independent web is configured to maintain a user hand web space in an open orientation. The term "open orientation" or "open configuration" with regard to a user web space describes a configuration with space between the index finger and thumb.

In some embodiments, the independent web positioner is an arched support system to accommodate the metacarpophalangeal joint of the thumb and index finger to fit in the web space. The term "arched" refers to a curved, crowned, or bowlike shape.

In some embodiments, the independent web positioner thumb ridge, finger ridge, or both include one or more textured regions.

In some embodiments, the base bore, independent web positioner support bore, or both include one or more non-skid elements.

In some embodiments, the one or more non-skid elements comprise a flexible non-skid element.

In some embodiments, the handle attachment and web support attachment are selected from snaps, magnets, clips, fasteners, snap-fit elements, pressure-fit elements, or combinations thereof.

In some embodiments, the handle is sized and shaped to support a user palmar arch and provide a surface upon which a user's middle finger, ring finger, and pinkie finger rest.

In some embodiments, the web support is sized and shaped to maintain a user web space in an open configuration.

In some embodiments, the base is sized and shaped to allow gripping by a user index fingertip, middle fingertip, and thumb. One embodiment of such an orientation is shown in FIG. 8b.

In some embodiments, the presently disclosed subject matter is directed to a method of providing a user's grip on a writing implement. Specifically, the method comprises positioning a user thumb, index finger and middle finger within the central indentation of a gripping system base. The system comprises a base defined by a first end and a second end. The base further includes a central indentation position about a width of the base, sized and shaped to accommodate a middle finger, index finger, and thumb of a user. The base includes an internal bore that spans an interior of the base from the first end to the second end. The system comprises a handle defined by a first end and a second end, and first and second bores that extend through an interior of the handle perpendicular to an axis extending from the first end to the second end. The handle also includes a handle attachment. The system includes a web support configured to releasably extend about an exterior surface of the handle, the web support defined by a first end and a second end, and an attachment that cooperates with the handle attachment to attach the web support to the handle. The system includes an independent web positioner defined by a first end and a second end, and an internal bore that is adjacent to the first end of the independent web positioner. The independent web positioner includes a thumb ridge sized and shaped to accommodate the thumb of a user and a finger ridge sized and shaped to accommodate the index finger of a use. The independent web positioner further includes an arched support system to accommodate the metacarpophalangeal joint of the thumb and index finger to fit in the web space. The independent web positioner is used alone or with the base only. The device independent web positioner, handle, web support, and base are configured to be added or removed as needed to customize the system. The method comprises positioning the handle within a user's palm, providing a surface to support the user's middle finger, ring finger, and pinkie finger. The method further includes attaching the web support to the device handle to stabilize the user's thumb and thumb metacarpophalangeal joint, wherein the web support is configured to be removed as desired by the user. The method includes positioning the user's index fingertip, middle fingertip, and thumb on the base. The device independent web positioner, handle, web support, and base are configured to be added or removed to adjust the grip of the user.

In some embodiments, the web support prevents or reduces hyperextension of the thumb.

In some embodiments, the web space of the user is maintained in an open orientation.

In some embodiments, a portion of the writing implement is passed through the independent web positioner bore, base bore, or both.

In some embodiments, at least one of the independent web positioner bore, base bore, or handle bore includes one or more non-skid elements.

In some embodiments, the one or more non-skid elements comprise flexible non-skid elements.

In some embodiments, the handle is sized and shaped to support a user palmar arch.

In some embodiments, the web support is sized and shaped to maintain a user's hand web space in an open orientation.

In some embodiments, the independent web positioner is configured as an arched support system to accommodate the metacarpophalangeal joint of the thumb and index finger to fit in the web space.

In some embodiments, the thumb ridge is sized and shaped to accommodate a user's thumb exterior portion and underside, and the user finger ridge is sized and shaped to accommodate an interior portion and underside of an index finger.

BRIEF DESCRIPTION OF THE DRAWINGS

The previous summary and the following detailed descriptions are to be read in view of the drawings, which illustrate some (but not all) embodiments of the presently disclosed subject matter.

FIGS. 7a and 7b are perspective views of device independent web positioners in accordance with some embodiments of the presently disclosed subject matter.

FIG. 7c is a perspective view of an independent web positioner and base positioned on a pencil in accordance with some embodiments of the presently disclosed subject matter.

FIG. 7d is a side plan view of an independent web positioner and base positioned on a pencil in accordance with some embodiments of the presently disclosed subject matter.

DETAILED DESCRIPTION

Figure 1A:
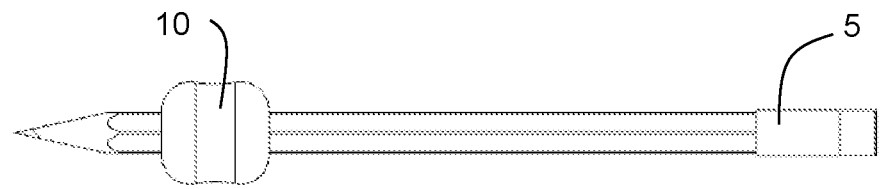
FIG. 1a is a side plan view of a writing implement comprising a system base in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−0.1-20% from the specified amount, as such variations are appropriate in the disclosed packages and methods.

The presently disclosed subject matter can be implemented in several different forms. However, the present disclosure of such embodiments is to be considered an example of the principles and are not intended to limit the invention to the specific embodiments shown and described. Like reference numerals are used to describe the same, similar, or corresponding part in the several views of the drawings. The detailed description defines terms used herein and specifically describes embodiments for those skilled in the art to practice the presently disclosed subject matter.

Figure 1B:
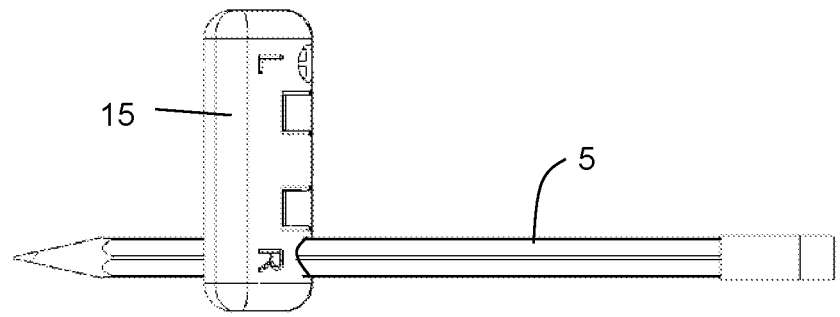
FIG. 1b is a side plan view of a writing implement comprising a handle in accordance with some embodiments of the presently disclosed subject matter.
Figure 1C:
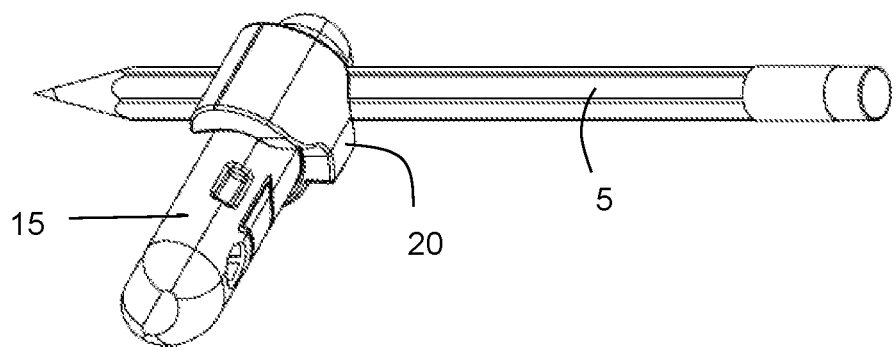
FIG. 1c is a side plan view of a writing implement comprising a handle and web support in accordance with some embodiments of the presently disclosed subject matter.
Figure 1D:
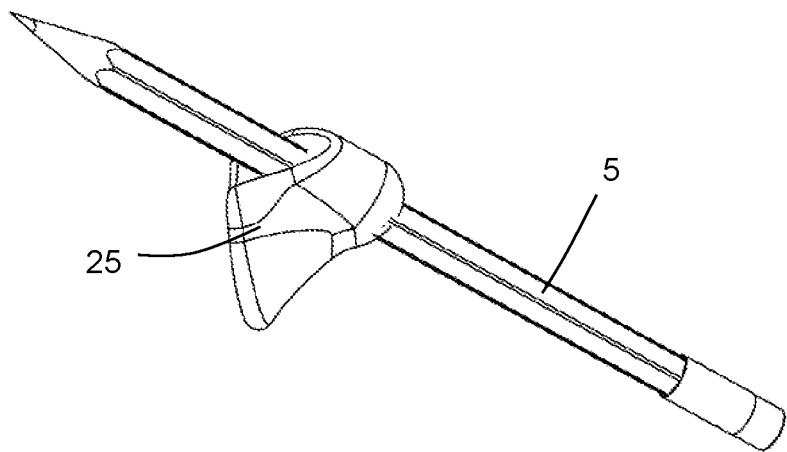
FIG. 1d is a side plan view of a writing utensil comprising an independent web positioner in accordance with some embodiments of the presently disclosed subject matter.

The presently disclosed subject matter is generally directed to a system that can be used to properly align a user's hand when gripping a writing implement. The term "writing implement" refers to any element that can be used for writing, such as (but not limited to) pencils, pens, markers, chalk, highlighters, and the like. The disclosed system includes four separate elements that combine in specific ways to grow and/or build a mature grasp. Specifically, the individual elements can be used separately or mixed and matched to customize a grip and discussed in more detail below. FIG. 1a illustrates base 10 that can be positioned around writing implement 5 to provide support for the user's fingers. Although a pencil is illustrated in the figures, it should be appreciated that any writing implement can be used. Handle 15 can releasably attach to the writing implement, providing support for the user's palm, middle finger, ring finger, and pinkie finger, as shown in FIG. 1b. Web support 20 can be releasably attached to the handle, thereby stabilizing the user's thumb and index finger metacarpophalangeal joint within the web space, thumb, and index finger to fit in the user's web while gripping the writing implement, as shown in FIG. 1c. The device can also include independent web positioner 25 that functions as an independent web positioner and can be moved towards or away from base 10 depending on the amount of separation needed. As described in detail below, the disclosed system provides several stages to develop and build a mature grip pattern.

Figure 2A:
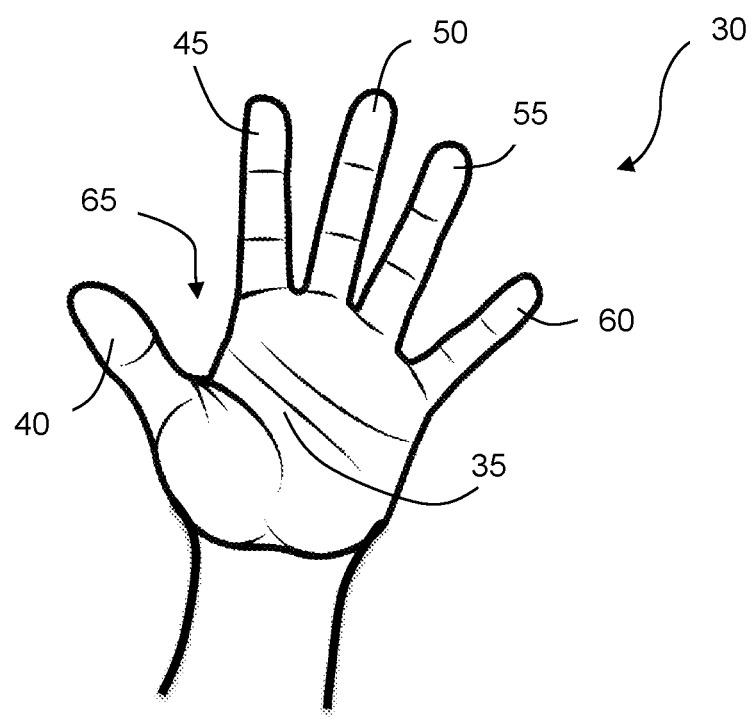
FIG. 2a is a front plan view of a hand in accordance with some embodiments of the presently disclosed subject matter.
Figure 2B:
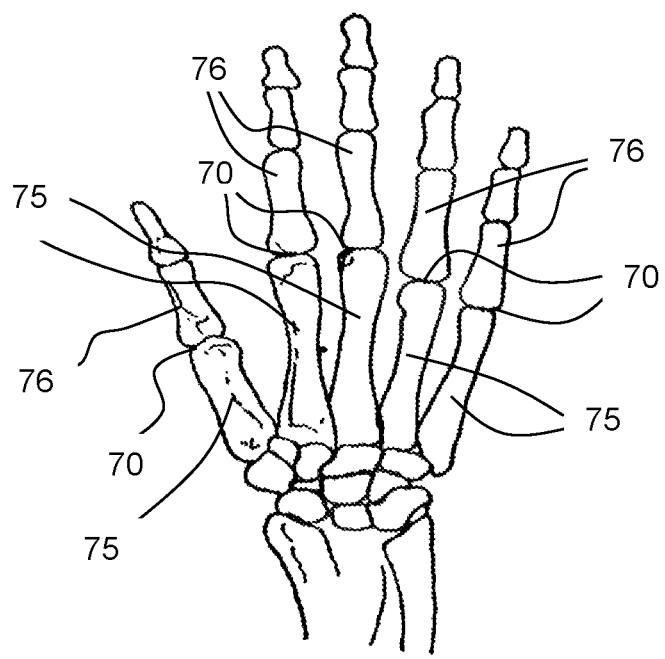
FIG. 2b is a front plan view of the bones of a hand in accordance with some embodiments of the presently disclosed subject matter.

FIGS. 2a and 2b are provided for reference to illustrate various anatomical terms discussed herein. Specifically, FIG. 2a illustrates representative hand 30 comprising palm 35, thumb 40, index finger 45, middle finger 50, ring finger 55, and pinkie finger 60. Web space 65 is located between the thumb and index fingers. The term "web space" refers to the space between the thumb and index finger that makes an "O" shape when the tips of the thumb and index finger are brought together. FIG. 2b illustrates certain relevant joints and bones of the hand. For example, metacarpophalangeal joint 70 of each digit is illustrated. The metacarpophalangeal joint is situated between metacarpal bone 75 and proximal phalange 76.

Figure 3:
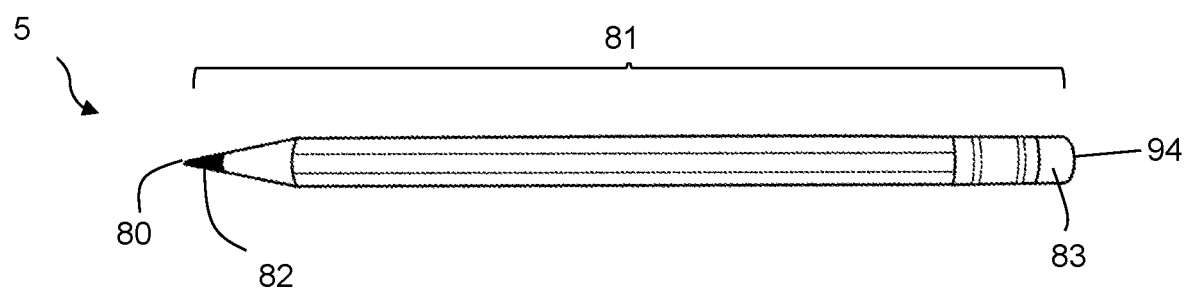
FIG. 3 is a side plan view of a writing implement in accordance with some embodiments of the presently disclosed subject matter.

As described above, the gripping system includes several components that can individually or in combination be used with a writing implement. FIG. 3 illustrates one embodiment of writing implement 5. As shown, the implement includes first end 80 (e.g., the writing end) and opposed second end 85, with length 81 therebetween. The first end can include writing tip 82 and the second end can include optional eraser 94. In lieu of an eraser, the second end can be blunt and/or can include a mechanism to hold a cap. It should be appreciated that the disclosed system can be used with any of a wide variety of writing implements, such as standard pencils, mechanical pencils, fountain pens, ball-point pens, markers, highlighters, and the like. The writing implement can have any cross-sectional shape, such as circular, oval, square, octagonal, hexagonal, etc. The writing implement can further be configured in any desired size, such as with a length (e.g., the distance between the first and second ends of the implement) of about 3-10 inches and a diameter of 0.5-2 inches. The term "diameter" refers to the distance from one side to an opposite side in any direction through the middle of a cross-section of the object.

Figure 4A:
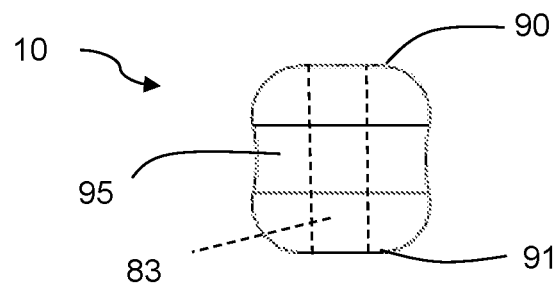
FIG. 4a is a side plan view of a system base in accordance with some embodiments of the presently disclosed subject matter.
Figure 4B:
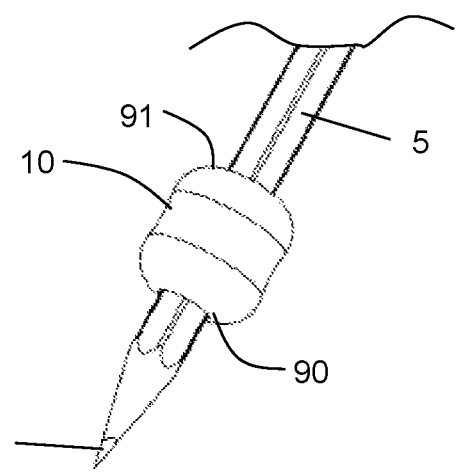
FIG. 4b is a perspective view of a base positioned on a pencil in accordance with some embodiments of the presently disclosed subject matter.

FIGS. 4a and 4b illustrate one embodiment of base 10. As shown, the base includes first end 90 that can be positioned adjacent to tip 82 of the writing implement and opposed second end 91. The term "adjacent" can refer to a distance of about 0.1-3 inches (e.g., 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3 inches) from the tip. The base creates a large diameter for the user's index fingertip, middle fingertip, and thumb to hold. In this way, the base places the user index finger 45, middle finger 50, and thumb 40 in an ergonomically correct position for stability and movement.

Figure 4C:
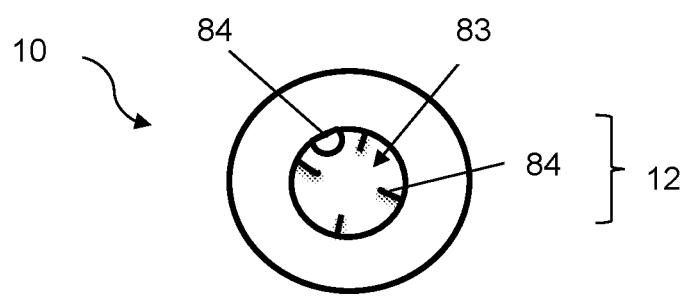
FIG. 4c is a top plan view of a device base bore in accordance with some embodiments of the presently disclosed subject matter.

The base includes interior bore 83 that passes from the first end to the second end of the base, through the base interior. The term "bore" refers to an internal cavity or passageway that extends through the interior of the base. The bore is sized and shaped to allow the base to pass over the external surface of a writing implement, as shown in FIG. 4*b*. In some embodiments, the bore can include one or more non-skid elements 84 that function to maintain the base on the writing utensil and prevent undesired movement of the base during use, as shown in FIG. 4*c*. The non-skid elements can be configured as non-skid elements, bumps, and the like and constructed from any material (e.g., silicon, rubber, etc.). The bore can have diameter 12 such that it allows a writing implement to pass through (e.g., at least/no more than about 0.2, 0.3, 0.4, 0.5, 0.6, 0.7, 0.8, 0.9, 1, 1.1, 1.2, 1.3, 1.4, or 1.5 inches).

As shown, the base can include central indentation 95 that accommodates the size and shape of a user's fingers. One or more indentations can be positioned to circle around the central surface of the base (e.g., about halfway between the first and second ends). Indentations 95 help secure the user's index finger 45, middle finger 50, and thumb 40 in a position that is comfortable, while also allowing the user to grip the writing implement. The indentations are large enough to allow the thumb and fingers to move slightly if readjustment is needed in case of fatigue yet remain within the proper alignment position for use. The base therefore functions to increase the surface area of the writing utensil without controlling the exact location of the user's fingers, as shown in FIG. 4*b*.

Figure 4D:
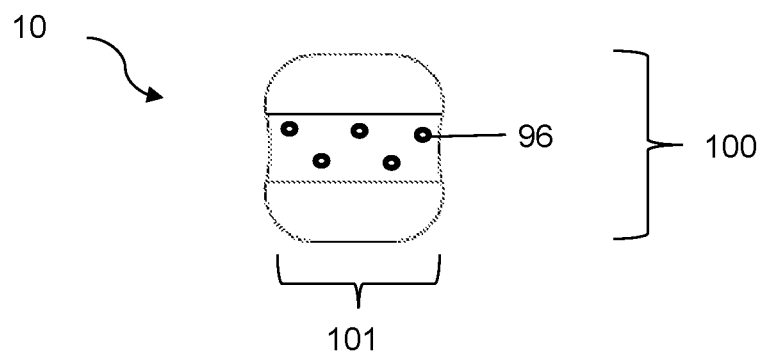
FIG. 4d is a side plan view of a device base in accordance with some embodiments of the presently disclosed subject matter.

In some embodiments, indentations 95 can include textured regions 96 to enhance the tactile properties of base 10, as shown in FIG. 4*d*. The textured regions can include ribs, bumps, recesses, or other discontinuities to promote retention of the user's thumb and index finger within the ridges.

The base has length 100, width 101, and/or thickness of about 0.5-3 inches (e.g., at least/no more than about 0.5, 1, 1.5, 2, 2.5, or 3). The term "length" refers to the longest straight line horizontal distance (e.g., the distance from base first end 90 to second end 91). The term "width" refers to the longest straight line vertical distance of the base. The term "thickness" refers to the support dimension perpendicular to both the length and width. It should be appreciated that the length, width, and thickness of base 10 can be greater or less than the ranges given herein, such as to adjust the device for smaller or larger sized hands (e.g., petite or larger users).

Although depicted with a round cross-sectional shape in the Figures, base 10 is not limited and can include any desired cross-sectional shape (e.g., square, rectangular, oval, triangular, abstract).

Figure 5A:
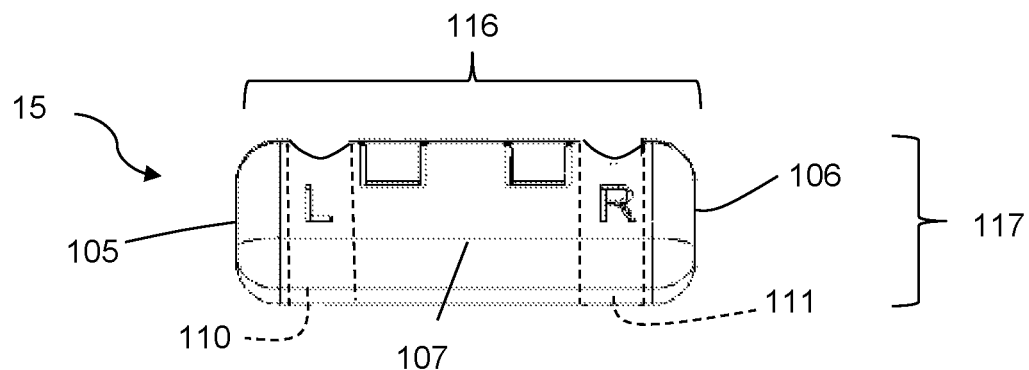
FIG. 5a is a side plan view of a system handle in accordance with some embodiments of the presently disclosed subject matter.

FIG. 5*a* illustrates one embodiment of handle 15 that releasably attaches to writing implement 5. As shown, the handle includes first end 105 and opposed second end 106 with main body 107 therebetween. The handle continues the grip to the user's palm and supports the palmar arch. The palmar arch crosses the palm of the hand superficial to the flexor tendons and is formed by the terminal portion of the ulnar artery and a superficial branch of the radial artery. Handle 15 is therefore sized and shaped to extend from web space 65 through palm 35 to metacarpal bone 75 of pinkie finger 60. The handle supports the metacarpal bones, tendons, and ligaments, and spaces that are void (to allow for growth) for the index, middle, ring, and pinkie fingers. Handle 15 further provides a surface upon which fingers 50, 55, and 60 can rest. As a result, the user can fully grasp the writing implement with the fingers, allowing the hand to remain in a functional position. The term "handle" can therefore refer to an element that supports the palm and palmar arch, as well as the metacarpal bones, tendons, and ligaments for the middle, ring, and pinkie fingers when used with a writing implement.

Figure 5B:
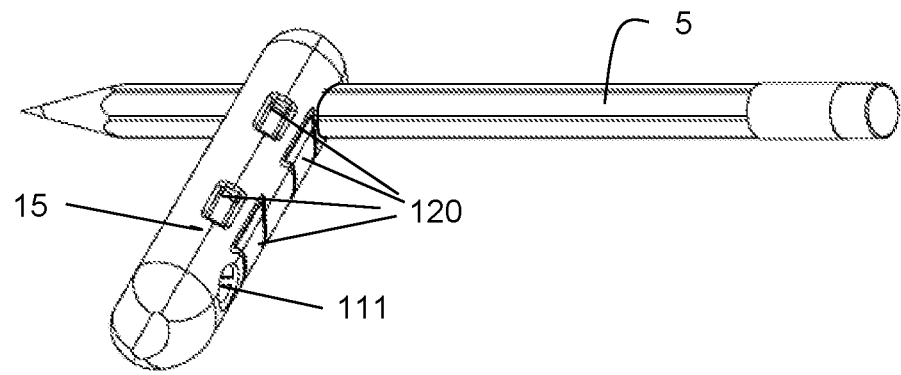
FIG. 5b is a perspective view of a handle positioned on a pencil in accordance with some embodiments of the presently disclosed subject matter.

The handle includes first and second bores 110, 111 that extend through the handle to accommodate a pencil, as shown in FIG. 5*b*. The first and second bores function to provide for left and right-handed user grip support, which can optionally be indicated by an "L" or a "R" on the handle as shown.

As described, the slender handle main body is sized and shaped to be positioned within user palm 35. For this reason, the handle body can be thin and can include width 117 of about 0.5-2 inches (at least/no more than about 0.5, 1, 1.5, 2 inches). The handle can further have any desired length 116, such as about 1-5 inches (e.g., at least/no more than about 0.5, 1, 1.5, 2, 2.5, 3, 3.5, 4, 4.5, or 5 inches) from first end 105 to second end 106. However, it should be appreciated that the presently disclosed subject matter is not limited and can be configured in any desired dimensions.

Figure 5C:
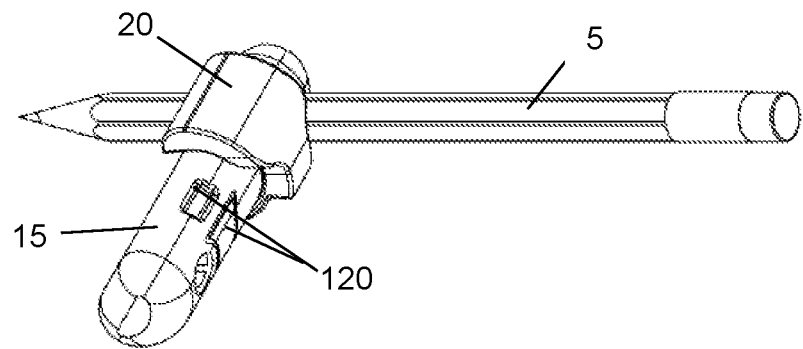
FIG. 5c is a perspective view of a handle and web support positioned on a pencil in accordance with some embodiments of the presently disclosed subject matter.

Handle 15 further includes a pair of connectors 120 that allow for the releasable attachment of web support 20, as shown in FIG. 5*c*. The connectors can include first and second units, one for each side (left or right-handed attachment). The handle connectors can be positioned on main body 107 about midway between ends 105, 106. The connectors can include any known joining element, such as snap fit, pressure fit, clasps, clips, fasteners, magnets, snaps, and the like. When only a single web support is in use, the opposite side connectors can be displayed, as shown in FIG. 5*c*.

Figure 6A:
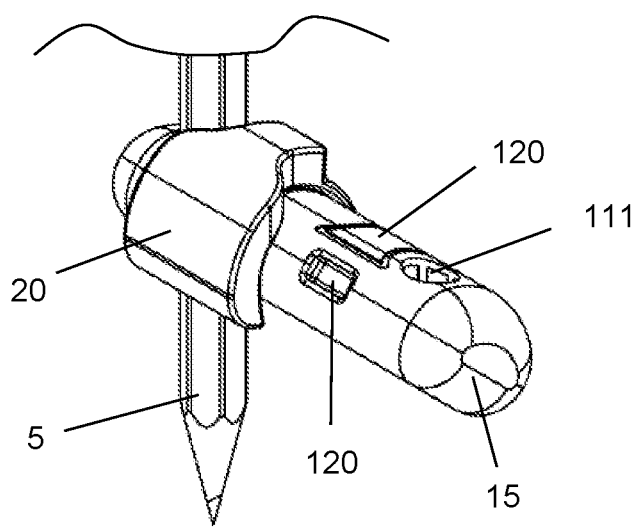
FIG. 6a is a perspective view of a web support connected to a handle in accordance with some embodiments of the presently disclosed subject matter.

FIG. 6*a* illustrates one embodiment of web support 20 that can connect to the handle and be used to stabilize a user's thumb 40 and/or web space 65 to prevent hyperextension at the joint. The web support also reinforces the thumb and index finger metacarpophalangeal joints 70 to place the thumb in a functional position. In this way, the thumb web space is supported. Web support 20 can be configured in a circular or round disc shape, although the presently disclosed subject matter is not limited and the web support can have any suitable shape. The term "web support" therefore can refer to an element that stabilizes a user's thumb and/or web space and reinforces the thumb metacarpophalangeal joint.

Figure 6B:
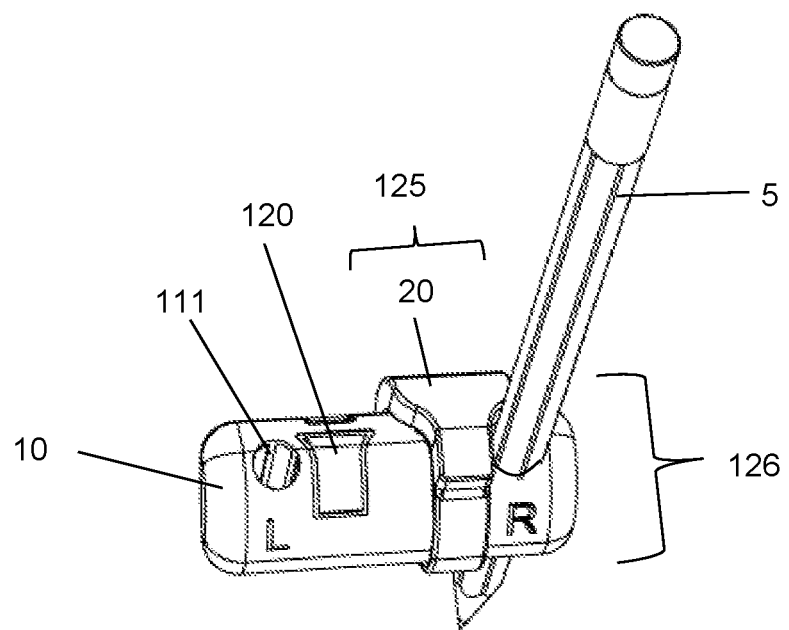
FIG. 6b is a perspective view of a web support connected to a handle in accordance with some embodiments of the presently disclosed subject matter.

The web support can have length 125 and/or width 126 of about 0.5-1.5 inches (e.g., at least/no more than about 0.5, 1, or 1.5 inches), as shown in FIG. 6*b*. The web support can have thickness of about 0.1-0.5 inches (e.g., at least/no more than about 0.1, 0.2, 0.3, 0.4, 0.5 inches). However, the web support is not limited and can be constructed with a length, width, and/or thickness outside the given ranges.

Figure 6C:
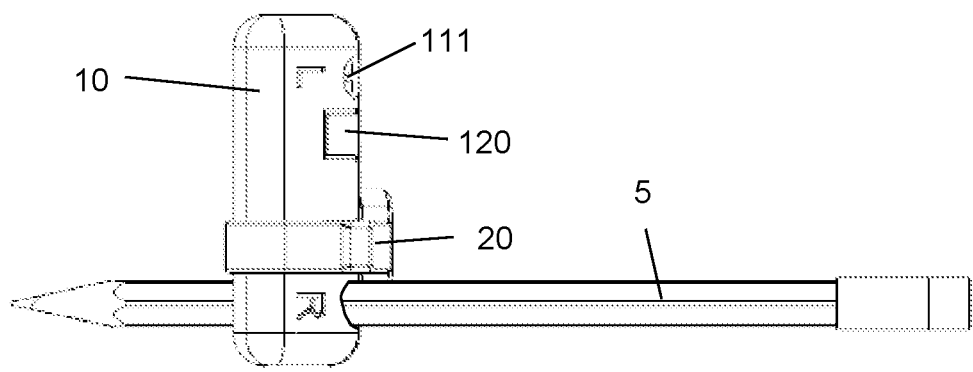
FIG. 6c is a side plan view of a web support positioned on a handle in accordance with some embodiments of the presently disclosed subject matter.

Web support 20 includes connectors positioned on the interior surface of the element (e.g., adjacent to the outer surface of the handle) that cooperate with the handle connectors to allow for releasable attachment of the web support, as shown in FIGS. 6*b* and 6*c*. As shown, the connectors allow the web support to encircle the handle fully or partially.

It should be appreciated that handle 15 and web support 20 are optional, and a user can employ base 10 without the handle and/or web support attached. When handle 15 is not needed, the disclosed gripping device can employ independent web positioner 25 that can be used alone or with base 10. FIGS. 7a and 7b illustrate one embodiment of independent web positioner 25 that can form a part of the disclosed grip device. As shown, the independent web positioner includes first end 130 and opposed second end 131. The independent web positioner is sized and shaped to fit into hand web space 65 extending beyond the anterior (front) surface of palm 35 to beyond the opposed posterior (rear) surface of the hand within the space between thumb 40 and index finger 45. The independent web positioner therefore provides stability to the index finger and thumb metacarpophalangeal joints 70. As a result, the hand web space is maintained open and the fingers are beneficially arranged in an optimal position to direct and control the writing implement. The term "independent web positioner" therefore refers to an element that fits into a user's web space and extends beyond the user's hand within the space between the thumb and index finger.

The independent web positioner can include internal bore 135 that extends through first end 130 that is sized and shaped to receive a writing implement, such as a pen or pencil. In some embodiments, bore 135 can have a circular cross-sectional shape. However, the presently disclosed subject matter is not limited and can be configured in any desired shape that accommodates a writing implement, such as (but not limited to) hexagonal, octagonal, and the like. The length of the writing implement can be securely accommodated by bore 135, such that tip 82 extends beyond the base first end, as shown in FIGS. 7c and 7d. The bore allows the independent web positioner to be moved toward or away from base 10, depending on the separation needed for a particular user.

Figure 7E:
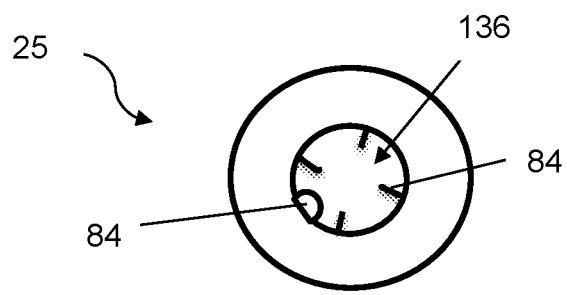
FIG. 7e is a top plan view of an independent web positioner bore in accordance with some embodiments of the presently disclosed subject matter.

The independent web positioner bore can have any desired diameter, such as about 0.1-1 inch (e.g., at least/no more than about 0.1, 0.2, 0.3, 0.4, 0.5, 0.6, 0.7, 0.8, 0.9, or 1 inch). In some embodiments, bore 135 can be configured to be slightly smaller than the outer circumference of writing implement 5 to allow the independent web positioner to be frictionally held in place when the base is in use. As with the bore of base 10, the independent web positioner bore can also include one or more non-skid elements 136 to resist movement of the support relative to the writing implement, as shown in FIG. 7e. Any non-skid element can be used.

The independent web positioner has length 140 and/or width 141 of about 0.5-2 inches (e.g., at least/no more than about 0.5, 0.75, 1, 1.25, 1.5, 1.75, or 2 inches). The term "length" refers to the longest straight line horizontal distance (e.g., the distance from the independent web positioner first end 130 to second end 131). The term "width" refers to the longest straight line vertical distance of the base. However, it should be appreciated that the length and width of independent web positioner 25 can be greater or less than the ranges given herein, such as to adjust the device for smaller or larger sized hands (e.g., petite or larger users).

The independent web positioner can include one or more ridges 142 that accommodate the size and shape of a user's thumb and index finger. Specifically, a ridge can be sized and shaped for the placement of the exterior portion and underside of a user's thumb 40. Similarly, the independent web positioner can include a ridge sized and shaped to accommodate the interior portion and underside of a user's index finger 45. The independent web positioner therefore provides for the placement of a user's index finger to oppose thumb 40 in a comfortable manner. Ridges 142 can be contoured in a concave manner, forming an indentation or depression as shown in the Figures. The independent web positioner can include 1, 2, 3, 4, 5, or more ridges. The ridges help secure the index finger and thumb in a position that is comfortable, while also allowing the user to grip the writing implement. The ridges are large enough to allow the thumb and index finger to move slightly if readjustment is needed in case of fatigue yet remain within the proper alignment position for use. The base therefore functions to increase the surface area of the writing utensil without controlling the exact location of the user's fingers.

In some embodiments, one or more of the independent web positioner ridges or surfaces can include textured regions 13, as shown in FIG. 7d. The textured regions can enable more secure gripping of the independent web positioner, without slippage during use. However, the textured regions are optional features.

It should be appreciated that the size of the various components of the disclosed system can be varied depending on a user's age, gender, and handedness. As a result, the system can be adapted for use by preschool children, primary school students, secondary school students, teenagers, adults, males, females, and so forth.

One or more components of the system can include markings or decorations. Since the device is commonly used with children, the device can include animal markings (spots, zebra stripes, etc.), glitter, sequins, and the like. Further, the various components of the disclosed gripping device can be configured in any desired color or pattern.

To ensure full functionality, the device can be configured for either the right hand or the left hand of the user. For example, the Figures depict a device suitable for use by the right hand. However, the left-handed version of the system can be a mirror image of the embodiments shown.

The components of system 1 can be constructed from a wide variety of materials. For example, one or more components can be constructed from rigid materials, such as one or more metal (e.g., stainless steel, steel, copper, titanium, platinum, gold, silver), fiberglass, rigid plastic, ceramics, glass, and the like. In some embodiments, one or more components of the device can be constructed from flexible materials, such as paper, cardboard, paperboard, rubber, composite materials, polyethylene terephthalate (PET), high-density polyethylene, polyvinyl chloride (PVC), polyvinylidene chloride (PVDC), polystyrene (PS), high impact polystyrene (HIPS) and polycarbonate (PC), silicone, or combinations thereof. Conveniently, the device can be manufactured by a molding process or using any other method known or used in the art.

In some embodiments, independent web positioner 25, handle 15, web support 20, and base 10 are made from the same material(s). However, the presently disclosed subject matter is not limited and the materials of one component can differ from the materials of at least one other component.

Figure 8A:
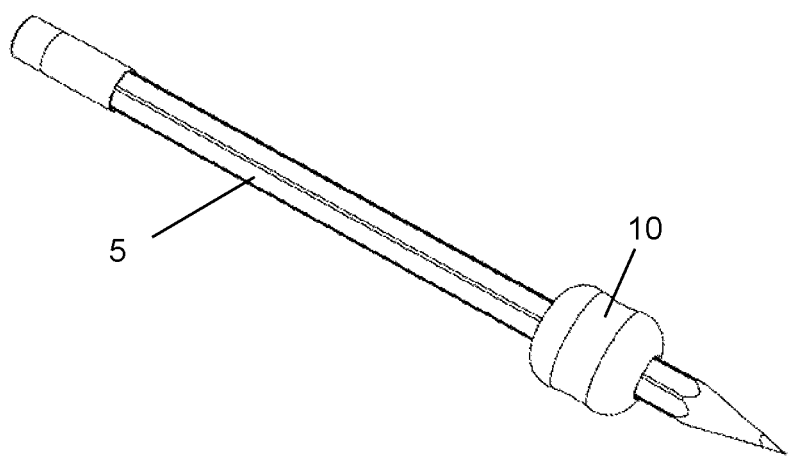
FIG. 8a is a perspective view of a pencil comprising a base in accordance with some embodiments of the presently disclosed subject matter.
Figure 8B:
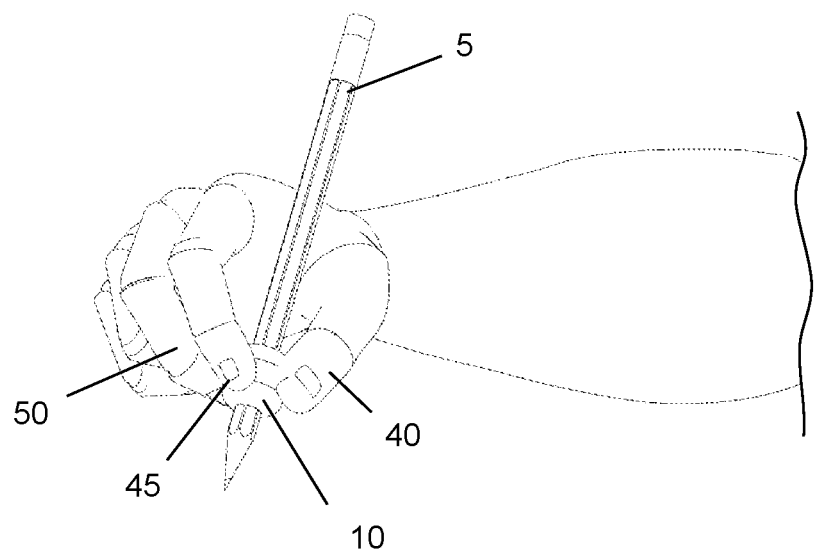
FIG. 8b is a perspective view of a base in use in accordance with some embodiments of the presently disclosed subject matter.

In use, base 10 can be configured on writing implement 5, as shown in FIG. 8a. Specifically, the pencil is manipulated through central bore 83 such that base first end 90 is positioned adjacent to the writing implement tip. A user can position the base at any desired location along the pencil length. In some embodiments, non-skid elements positioned within bore 83 retain the base at a desired location, resisting against slipping up or down the length of the pencil. FIG. 8a illustrates the base inserted on a tip end 82 of the writing implement. The base provides a large diameter for the user's index fingertip, middle fingertip, and thumb to hold, as shown in FIG. 8b. In this way, the base places the user index finger 45, middle finger 50, and thumb 40 in an ergonomically correct position for stability and movement when using the writing implement. Central indentation 95 accommodates the size and shape of a user's fingers and helps secure the user's index finger 45, middle finger 50, and thumb 40 in a position that is comfortable, while also allowing for proper grip. In some embodiments, the base can be used alone (e.g., without the handle, web support, or independent web positioner).

Figure 8C:
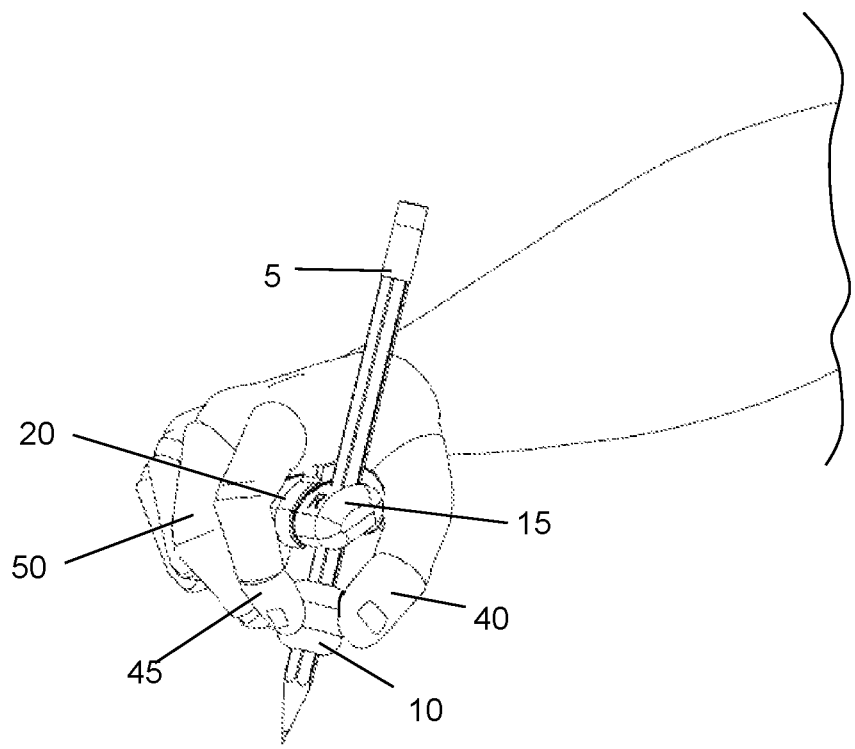
FIG. 8c is a perspective view of a pencil comprising a base, handle, and web support in use in accordance with some embodiments of the presently disclosed subject matter.

In some embodiments, handle 15 can also be attached to the writing implement through bore 110 or 111. It should be appreciated that handle 15 is optional, and the base can be used without attachment of the handle. In some embodiments web support 20 can be releasably connected to the handle, as shown in FIG. 8c. Particularly, the handle and web support can be releasably joined together using any mechanism (e.g., snaps, clips, fasteners, and the like). The web support can be used to stabilize a user's thumb 40 and/or web space 65 to prevent hyperextension at the joint. The web support also reinforces thumb metacarpophalangeal joint 70 to place the thumb in a functional position. In this way, the thumb web space is supported. It should be appreciated that the web support is optional, and the base and handle can be used without the addition of the web support.

Figure 8D:
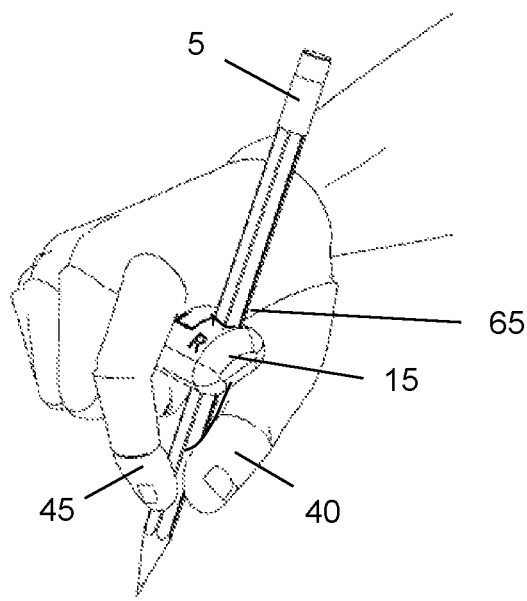
FIGS. 8d and 8e are perspective views of a pencil comprising a handle in use in accordance with some embodiments of the presently disclosed subject matter.
Figure 8E:
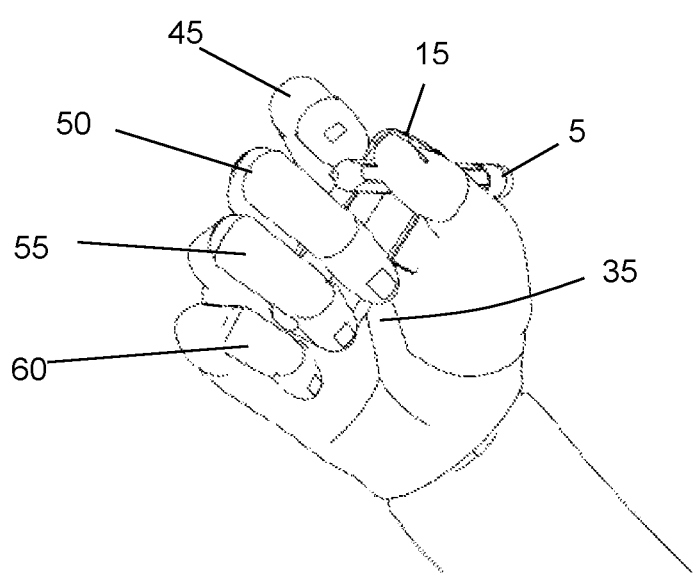

Optionally, the handle can be used alone, without the web support, independent web positioner, and/or base, as illustrated in FIGS. 8d-8e. When the handle is included in the system, it continues the grip to the user's palm and supports the palmar arch. Handle 15 therefore extends from the user's web space through the palm to the metacarpal bone of pinkie finger 60. The handle supports the metacarpal bones, tendons, and ligaments, and spaces that are void (to allow for growth) for the index, middle, ring, and pinkie fingers. Handle 15 further provides a surface upon which the fingers can rest. As a result, the user can fully grasp the writing implement with the fingers, allowing the hand to remain in a functional position.

Figure 9A:
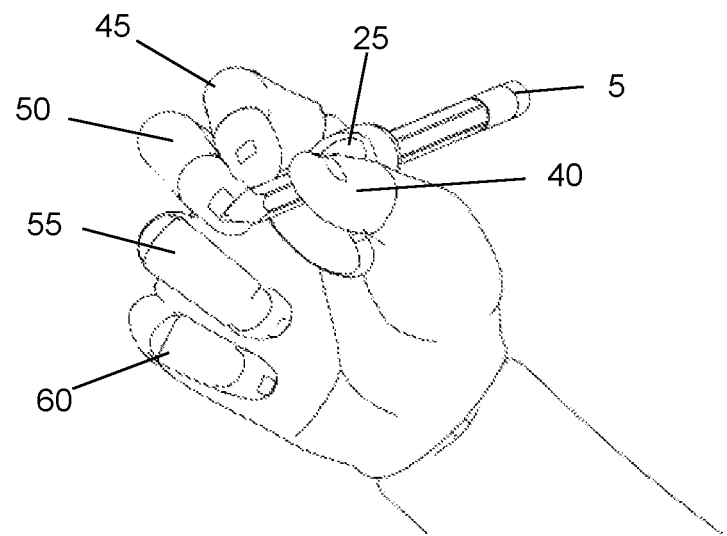
FIGS. 9a and 9b are perspective views of a pencil comprising an independent web positioner in use in accordance with some embodiments of the presently disclosed subject matter.
Figure 9B:
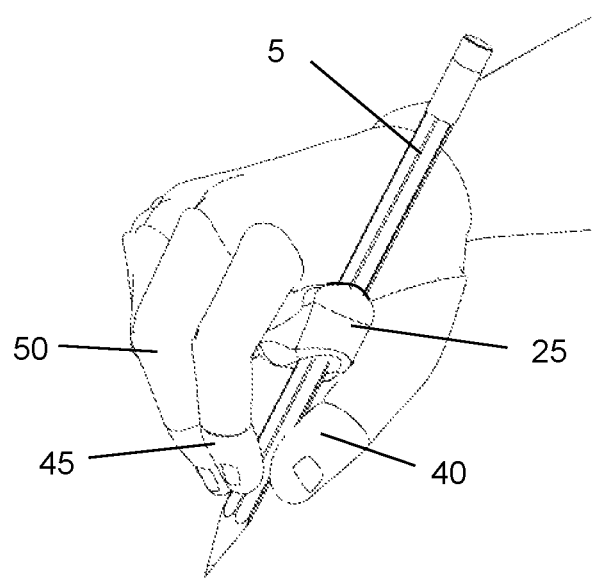
Figure 9C:
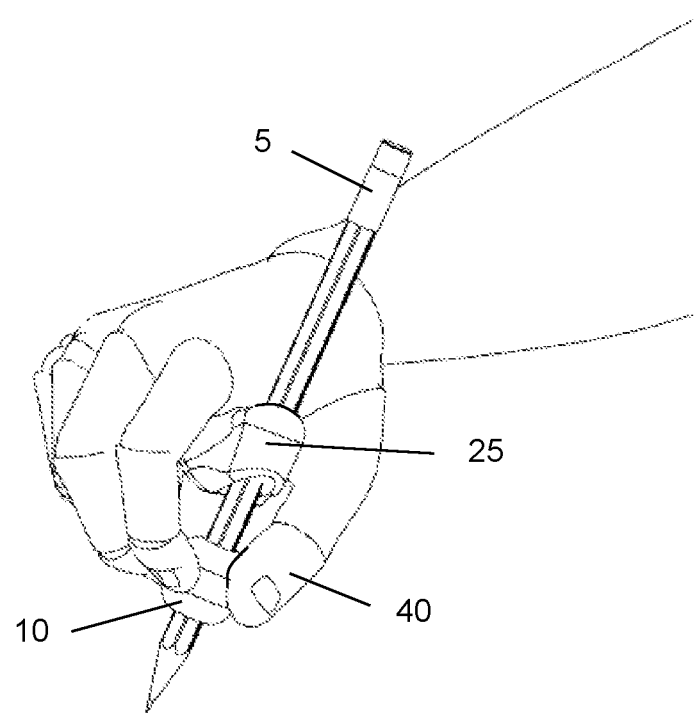
FIG. 9c is a perspective view of a pencil comprising an independent web positioner and base in use in accordance with some embodiments of the presently disclosed subject matter.

When handle 15 is not needed, independent web positioner 25 can be used with base 10 or alone, as shown in FIGS. 9a-9c. The ridges of the independent web positioner accommodate the metacarpophalangeal joint of the thumb and index finger. Specifically, an independent web positioner ridge can be sized and shaped for the placement of the exterior portion and underside of a user's thumb 40. The independent web positioner can further include a ridge sized and shaped to accommodate the interior portion and underside of a user's index finger 45. The independent web positioner therefore provides for the placement of a user's index finger to oppose thumb 40 in a comfortable manner. The ridges help secure the index finger and thumb in a position that is comfortable, while also allowing the user to grip the writing implement. The ridges are large enough to allow the thumb and index finger to move slightly if readjustment is needed in case of fatigue yet remain within the proper alignment position for use.

A user can use the disclosed system 1 to correct the writing implement posture. Specifically, the base increases the surface area of the writing utensil, allowing it to be more easily grasped by the user. The user's thumb and index finger can be positioned within the indentations on the base, allowing for comfortable positioning during use. Handle 15 continues the grip into the user's palm and provides a structure for the middle, ring, and pinkie fingers to rest. The web support can be positioned on the handle at the base of the user's thumb or web space. Web support 20 stabilizes the user's thumb to prevent hyperextension and supports the metacarpophalangeal joint. As a result, the user's thumb is in a functional position. The independent web positioner can be used when the handle is not needed. Specifically, the base creates a large diameter for the user's index fingertip, middle finger fingertip, and thumb to grip. The larger diameter gripping space places the index finger, middle finger, and thumb in an ergonomically correct position for stability and movement.

The disclosed system offers many advantages over prior art devices. For example, device 5 can be customized as desired by the user. Particularly, independent web positioner 25, handle 15, web support 20, and base 10 can be combined in specific ways to group or build a mature grasp. Therefore, the device is customizable to support the needs of a particular user.

The system can be enjoyed by a variety of users, including children, teenagers, adults, and the like.

Advantageously, the base increases the surface area of writing implement 5 without controlling the exact location of the user's fingers. In this way, the user maintains a comfortable feel during use of the device.

Further, the handle continues the grip to the user's palm and supports the palmar arch, as well as provides a resting position for the fingers. Accordingly, the handle allows a full grasp with the fingers and hand in a functional position.

Web support stabilizes the web space of thumb 40 to prevent hyperextension and supports the metacarpophalangeal joint to place the thumb in a functional position.

The disclosed gripping device is small and easily portable, allowing a user to carry the device from one location to another.

Although the presently disclosed subject matter has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A corrective gripping system comprising:
   a base defined by:
      a first end and a second end;
      a central indentation positioned about a width of the base, sized and shaped to accommodate a middle finger, index finger, and thumb of a user;
      an internal bore that spans an interior of the base from the first end to the second end;
   a handle defined by:
      a first end and a second end;
      first and second bores that extend perpendicular to an axis extending from the first end to the second end;
      a handle attachment;
   a web support configured to releasably extend about an exterior surface of the handle, the web support defined by:
      a first end and a second end;
      an attachment that cooperates with the handle attachment to attach the web support to the handle;
   an independent web positioner defined by:
      a first end and a second end;
      an internal bore that is adjacent to the first end of the independent web positioner;
      a thumb ridge sized and shaped to accommodate the thumb of a user, a finger ridge sized and shaped to accommodate the index finger of a user;
   wherein the independent web positioner is used alone or with the base only; and
   wherein the independent web positioner, handle, web support, and base are configured to be added or removed as needed to customize the system.

2. The system of claim 1, further comprising a writing implement selected from a pencil, a pen, a marker, or combinations thereof.

3. The system of claim 1, wherein the independent web and the independent web positioner are configured to maintain a user hand webspace in an open orientation.

4. The system of claim 1, wherein the independent web positioner thumb ridge is sized and shaped to accommodate an exterior portion and underside of a user thumb, and the finger ridge is sized and shaped to accommodate an interior portion and underside of a user index finger.

5. The system of claim 1, wherein the independent web positioner thumb ridge, finger ridge, or both include one or more textured regions.

6. The system of claim 1, wherein the base bore, independent web positioner bore, or both include one or more anti-skid elements.

7. The system of claim 6, wherein the one or more anti-skid elements comprise flexible non-skid elements.

8. The system of claim 1, wherein the handle attachment and web support attachment are selected from snaps, magnets, clips, fasteners, snap-fit elements, pressure-fit elements, or combinations thereof.

9. The system of claim 1, wherein the handle is sized and shaped to support a user palmar arch and provide a surface upon which a user index finger, middle finger, ring finger, and pinkie finger rest.

10. The system of claim 1, wherein the web support is sized and shaped to maintain a user webspace in an open configuration.

11. The system of claim 1, wherein the base is sized and shaped to allow gripping by a user index fingertip, middle fingertip, and thumb.

12. A method of providing a user's grip on a writing implement, the method comprising:
  positioning a user thumb and index finger within the central indentation of a base, the gripping system comprising:
    the base defined by:
    a first end and a second end;
    a central indentation position about a width of the base, sized and shaped to accommodate a middle finger, index finger, and thumb of a user;
    an internal bore that spans an interior of the base from the first end to the second end;
    a handle defined by:
    a first end and a second end;
    first and second bores that extend perpendicular to an axis extending from the first end to the second end;
    a handle attachment;
    a web support configured to releasably extend about an exterior surface of the handle, the web support defined by:
    a first end and a second end;
    an attachment that cooperates with the handle attachment to attach the web support to the handle;
    an independent web positioner defined by:
    a first end and a second end;
    an internal bore that is adjacent to the first end of the independent web positioner;
    a thumb ridge sized and shaped to accommodate the thumb of a user,
    a finger ridge sized and shaped to accommodate the index finger of a user;
  positioning the handle within a user's palm, providing a surface to support the user's middle finger, ring finger, and pinkie finger;
  attaching the web support to the handle to stabilize the user's thumb and thumb metacarpophalangeal joint, wherein the web support is configured to be removed as desired by the user;
  positioning the user's index fingertip, middle fingertip, and thumb on the base when the handle is not attached to the base;
  wherein the device independent web positioner, handle, web support, and base are configured to be added or removed to adjust the grip of the user.

13. The method of claim 12, wherein the web support prevents or reduces hyperextension of the thumb.

14. The method of claim 12, wherein the webspace of the user is maintained in an open orientation.

15. The method of claim 12, wherein a portion of the writing implement is passed through the independent web positioner bore, base bore, or both.

16. The method of claim 12, wherein at least one of the independent web positioner bore, base bore, or handle bores include one or more anti-skid elements.

17. The method of claim 16, wherein the one or more anti-skid elements comprise flexible non-skid elements.

18. The method of claim 12, wherein the handle is sized and shaped to support a user palmar arch.

19. The method of claim 12, wherein the web support is sized and shaped to maintain a user's hand webspace an open orientation.

20. The method of claim 12, wherein the thumb ridge is sized and shaped to accommodate a user's thumb exterior portion and underside, and the user finger ridge is sized and shaped to accommodate an interior portion and underside of an index finger.

* * * * *